(12) United States Patent
Kimura et al.

(10) Patent No.: US 7,144,055 B2
(45) Date of Patent: Dec. 5, 2006

(54) VEHICLE BODY FRONTAL STRUCTURE

(75) Inventors: Yusuke Kimura, Kawachi-gun (JP); Toshiyuki Yanaoka, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 29 days.

(21) Appl. No.: 11/120,771

(22) Filed: May 3, 2005

(65) Prior Publication Data
US 2005/0248164 A1 Nov. 10, 2005

(30) Foreign Application Priority Data
May 7, 2004 (JP) ............................. 2004-138322

(51) Int. Cl.
*B60R 19/32* (2006.01)
(52) U.S. Cl. ........................ 293/133; 293/155
(58) Field of Classification Search .......... 296/187.09; 293/132, 133, 154, 155
See application file for complete search history.

(56) References Cited
U.S. PATENT DOCUMENTS
5,056,840 A * 10/1991 Eipper et al. ............... 293/120

| 5,139,297 A | * | 8/1992 | Carpenter et al. | 293/132 |
| 6,406,081 B1 | * | 6/2002 | Mahfet et al. | 293/133 |
| 2006/0055187 A1 | * | 3/2006 | Jaarda et al. | 293/133 |

FOREIGN PATENT DOCUMENTS
JP 11-342812 12/1999
JP 2003-212069 7/2003

* cited by examiner

*Primary Examiner*—Joseph D. Pape
(74) *Attorney, Agent, or Firm*—Rankin, Hill, Porter & Clark LLP

(57) ABSTRACT

A vehicle body frontal structure includes a bumper face extending in a widthwise direction of a vehicle, a bumper beam disposed behind the bumper face and extending in the widthwise direction of the vehicle; and an energy absorbing member disposed between the bumper face and the bumper beam, formed in a hollow cross sectional shape of which a rear portion is left open, and having an open edge portion that is joined to the bumper beam, so as to deform and absorb collision energy when the collision energy in a rearwards direction of the vehicle is applied to the bumper face. The open edge portion includes cutaway portions which leave portions of the open edge portion as joining leg portions to the bumper beam, and the joining leg portions are provided with deformation guide portions which, in the initial period of deformation by the collision energy, cause the open edge portion to tilt in a predetermined direction.

2 Claims, 7 Drawing Sheets

VEHICLE BODY FRONTAL STRUCTURE

BACKGROUND OF THE INVENTION

1. Field of the Invention

The present invention relates to a vehicle body frontal structure which can be applied to a vehicle such as an automobile or the like.

Priority is claimed on Japanese Patent Application No. 2004-138322, filed May 7, 2004, the content of which is incorporated herein by reference.

2. Description of Related Art

In the past, in a vehicle body frontal structure for an automobile or the like, from the point of view of enhancing the collision absorption performance of the bumper, it has been per se known to provide an energy absorbing member which can absorb the energy of collision between the bumper face and the bumper beam. Among such energy absorbing members, one is per se known (for example, refer to Japanese Unexamined Patent Application, First Publication No. H11-342812) in which a separate member is joined as one unit to the bumper beam, and one which is formed as one unit with the bumper beam (for example, refer to Japanese Unexamined Patent Application, First Publication No. 2003-212069). Furthermore, among the latter type, there is a per se known one in which the bumper beam and the energy absorbing member are formed together as one unit using an extruded aluminum material or the like, and moreover, by making the energy absorbing member with a cross sectional shape of pantograph form, its energy absorption efficiency is enhanced, while minimizing the amount of incomplete collapse in the energy absorbing member.

With the above described prior art techniques, when questions of manufacturing efficiency and the like are considered, in practice the former is more usually employed. However, with the former, if an attempt is made to restore the pantograph shaped cross sectional shape to its original condition, this is difficult since its structure is rather complicated; and accordingly, from this type of point of view, there is a demand for a structure in which the amount of incomplete collapse in the energy absorbing member is minimized.

SUMMARY OF THE INVENTION

In view of the above circumstances, an object of the present invention is to provide a vehicle body frontal structure in which the amount of incomplete collapse in the energy absorbing member can be minimized with a simple configuration.

As a means for solving the above described problem, the present invention provides a vehicle body frontal structure including: a bumper face extending in a widthwise direction of a vehicle; a bumper beam disposed behind the bumper face and extending in the widthwise direction of the vehicle; and an energy absorbing member disposed between the bumper face and the bumper beam, formed in a hollow cross sectional shape of which a rear portion is left open, and having an open edge portion that is joined to the bumper beam, so as to deform and absorb collision energy when the collision energy in a rearwards direction of the vehicle is applied to the bumper face; wherein the open edge portion includes cutaway portions which leave portions of the open edge portion as joining leg portions to the bumper beam, and wherein the joining leg portions are provided with deformation guide portions which, in the initial period of deformation by the collision energy, cause the open edge portion to tilt in a predetermined direction.

The present invention provides a vehicle body frontal structure including: a bumper face extending in a widthwise direction of a vehicle; a bumper beam disposed behind the bumper face and extending in the widthwise direction of the vehicle; and an energy absorbing member disposed between the bumper face and the bumper beam, formed in a hollow cross sectional shape of which a rear portion is left open, and having an open edge portion that is joined to the bumper beam, so as to deform and absorb collision energy when the collision energy in a rearwards direction of the vehicle is applied to the bumper face; wherein the open edge portion includes joining leg portions that are joined to the bumper beam, and wherein the joining leg portions are provided with deformation guide portions which, in the initial period of deformation by the collision energy, cause the open edge portion to tilt in a predetermined direction.

According to the above structures, when, due to a collision, a body comes into violent contact with the bumper face, and collision energy is applied to the bumper face in the rearwards direction of the vehicle, and the energy is inputted to the energy absorbing member and starts to deform it, first, this deformation begins at the joining leg portions which are partially provided. At this time, due to the provision of the deformation guide portions, the open edge portion deforms so as to tilt towards a predetermined direction (for example, in cross section, towards the interior of the energy absorbing member), and thereby, as the subsequent deformation is induced, it becomes possible for the energy absorbing member to be collapsed smoothly, so that, as a result, the amount of incomplete collapse in the energy absorbing member can be minimized.

According to the structure of the present invention, since the amount of incomplete collapse in the energy absorbing member can be minimized, it becomes possible to take advantage of the space between the bumper face and the bumper beam, with no wastage of the deformation stroke of the energy absorbing member. In other words, it is possible to enhance the collision energy absorption efficiency of the vehicle body frontal portion. Furthermore, there is no influence upon the design of the bumper face or upon the component layout surrounding the bumper beam or the like, and it is possible to enhance the freedom of design of the vehicle body frontal portion. Moreover, by providing the cutaway portions, it is possible to anticipate a lightening of the energy absorbing member.

DETAILED DESCRIPTION OF THE INVENTION

In the following, a preferred embodiment of the present invention will be explained with reference to the drawings. It should be understood that, in this explanation, the orientations of front, rear, left, and right and so on are to be understood as being referred to the body of the vehicle, unless specifically stated otherwise. Furthermore, the arrow signs FR in the figure refers to the forward direction of the vehicle, while the arrow sign LH refers to the direction towards the left side of the vehicle and the arrow sign UP refers to the upward direction relative to the vehicle.

Figure 1:
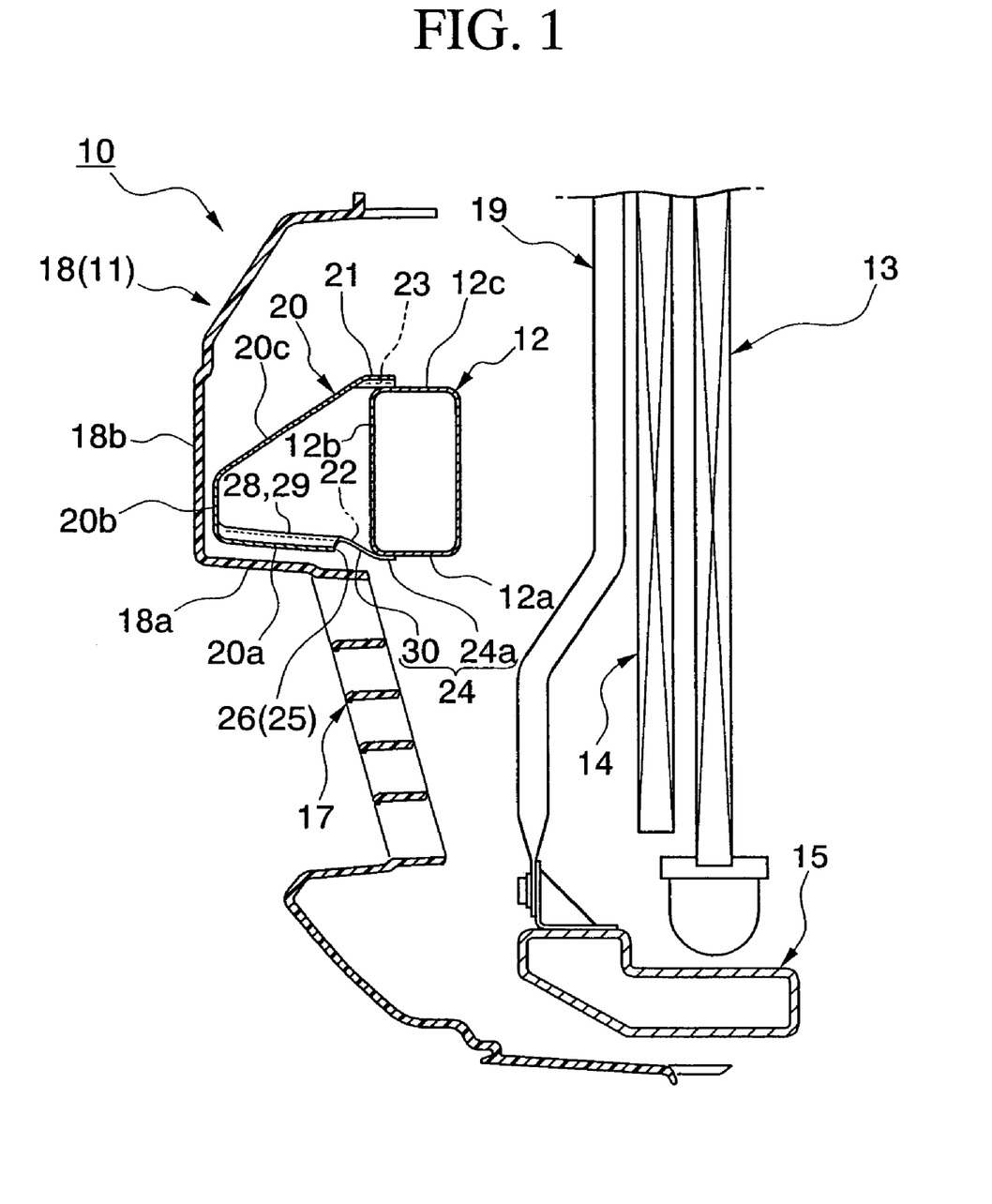
FIG. 1 is a sectional view of a vehicle body frontal portion according to a preferred embodiment of the present invention, taken in a central vertical plane which extends along the longitudinal direction of the vehicle.

FIG. 1 is a sectional view of the front end portion of a vehicle such as an automobile or the like taken in a central vertical plane extending along the longitudinal direction of the vehicle, and, as shown in this figure, a front bumper 10 of the vehicle includes a bumper face 11 and a bumper beam 12, both of which extend in the widthwise direction of the vehicle. The bumper beam 12 is positioned in front of a radiator 13 for the engine of the vehicle and a condenser 14 for an air conditioning system of the vehicle and so on, and the bumper face 11 is provided so as to cover over the bumper beam 12 from the front.

The bumper beam 12 is, for example, made as a roughly rectangular steel tube arranged so that the long dimension of its cross sectional shape extends vertically, and this type of bumper beam 12 extends, just like a cross member 15 of the vehicle body, so as to straddle side frames (not shown in the figures) on the left and right sides of the body of the vehicle; and, moreover, both of its end portions are connected via connecting stays 16 (refer to FIGS. 2 and 3) to the side frames. By this arrangement, the bumper beam 12 also functions as a reinforcing member for the frontal portion of the vehicle body.

The bumper face 11 is made from a thermoplastic resin such as, for example, polypropylene or the like, and it constitutes one of the external surfaces of the vehicle which endow it with its characteristic appearance. A grille 17 is provided at a location somewhat below the central portion of the bumper face 11 in its vertical direction, for allowing air provided by the motion of the vehicle to be supplied to the radiator 13 and the condenser 14, and, above and below the grille 17, the cross sectional shape of the bumper face 11 is formed so as to be open to the rear.

At the region of the bumper face 11 above the grille 17 (in the following, termed the bumper upper portion 18), the height of the bumper bottom wall portion 18a and the height of the bottom wall portion 12a of the bumper beam 12 are approximately equal to one another. Furthermore, the bumper beam 12 is provided so as to overlap with the lower half portion of the bumper upper portion 18 as seen in elevation from the front of the vehicle. In other words, the bumper beam 12 extends along the bumper upper portion 18 while being located as low as possible.

It should be understood that the reference symbol 19 in the figures denotes a strengthening frame which extends between a cross member 15 and an upper radiator support member (not shown in the drawings). If the bumper beam 12 is to shift to the rear, this strengthening frame 19 must allow this shifting, and accordingly the strengthening frame 19 is cranked towards the rearward direction at its upper portion which is at the same height as the bumper beam 12, thus allowing space for such rearward shifting thereof. The bumper beam 12 is thus disposed at a roughly central position between this strengthening frame 19 and the bumper front wall portion 18b of the bumper face 11.

Moreover, a safety plate (an energy absorbing member) 20 is provided between the bumper beam 12 and the bumper face 11, and, when the vehicle collides with some object which hits the bumper face 11, this safety plate 20 deforms so as to receive the energy of the collision, and, by absorbing a part or all of this collision energy, mitigates the damage to the vehicle and to the object with which the vehicle has collided.

Figure 2:
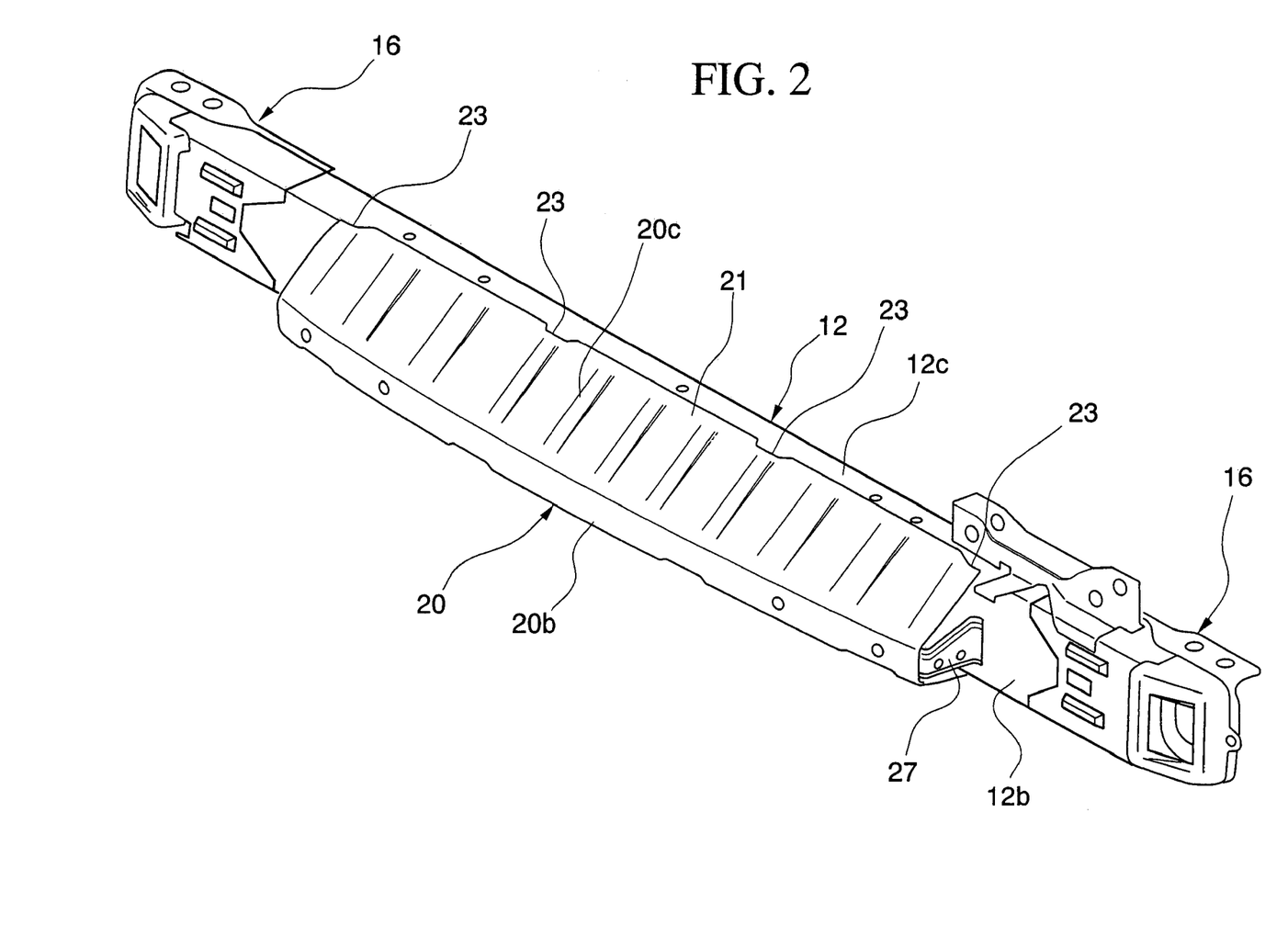
FIG. 2 is a perspective view of a bumper beam and a safety plate as seen from diagonally above.
Figure 3:
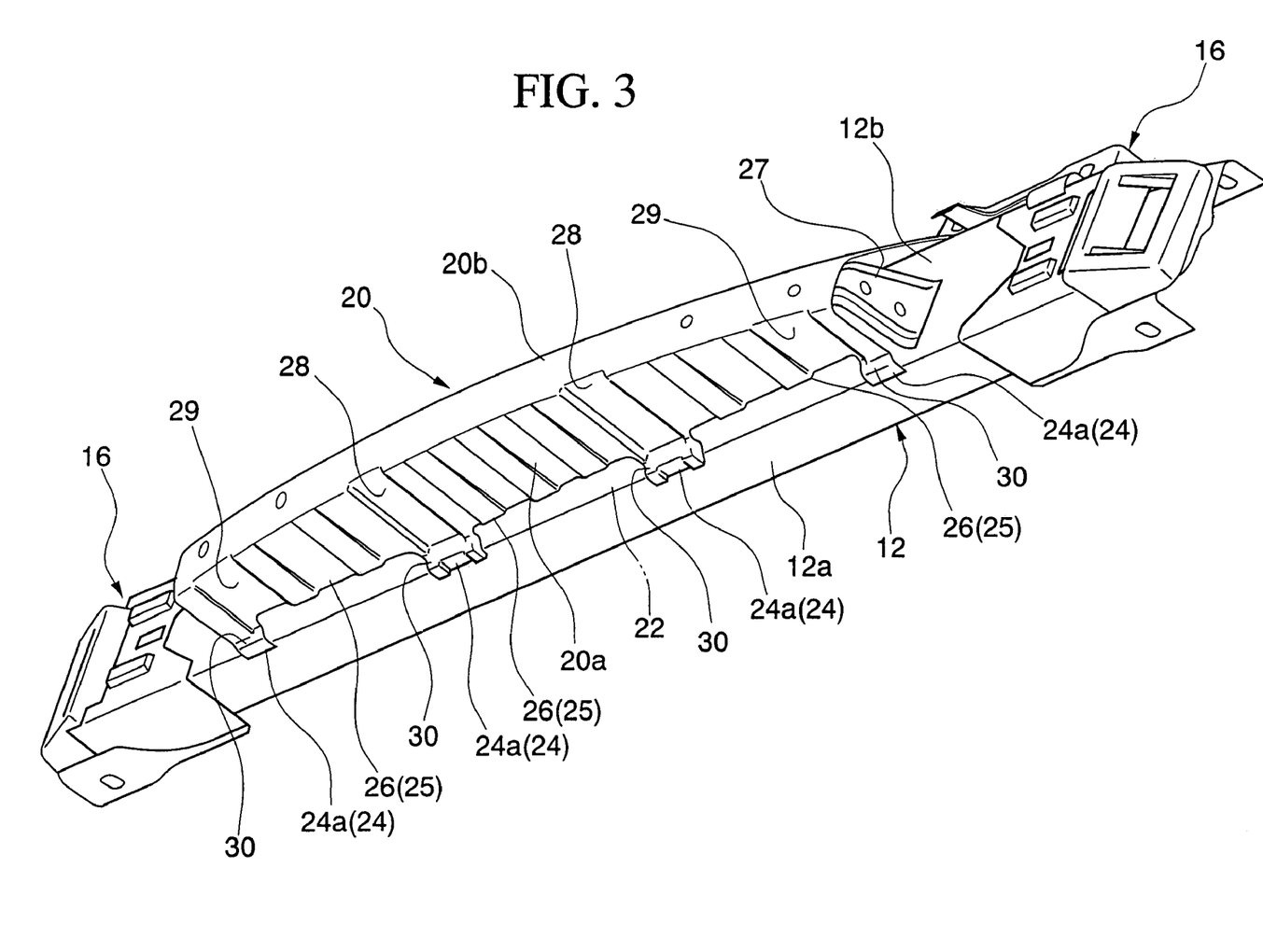
FIG. 3 is a perspective view of the bumper beam and the safety plate as seen from diagonally below.

Referring to FIGS. 2 and 3 together, this safety plate 20 has a hollow cross sectional shape of which the rear portion is open, and it is made by, for example, press forming a steel plate. This safety plate 20 includes a plate upper wall portion 20c which is provided so as to slant downwards to the front, a plate bottom wall portion 20a which is provided so as to extend in a generally horizontal direction, and a plate front wall portion 20b which is provided so as to extend in a generally vertical direction, and so as to extend between the front edges of the plate upper wall portion 20c and the plate bottom wall portion 20a.

Furthermore, the safety plate 20 is made so as to have a substantially V-shaped cross sectional shape, with the plate front wall portion 20b which is provided at its generally lower half portion projecting to the front as a vertex portion. It should be understood that this plate front wall portion 20b is disposed so as to be in the proximity of the bumper front wall portion of the bumper face 11, and moreover is bulged out so as to be of a convex shape towards the front along the bumper front wall portion 18b, as seen from the exterior of the vehicle.

Figure 4:
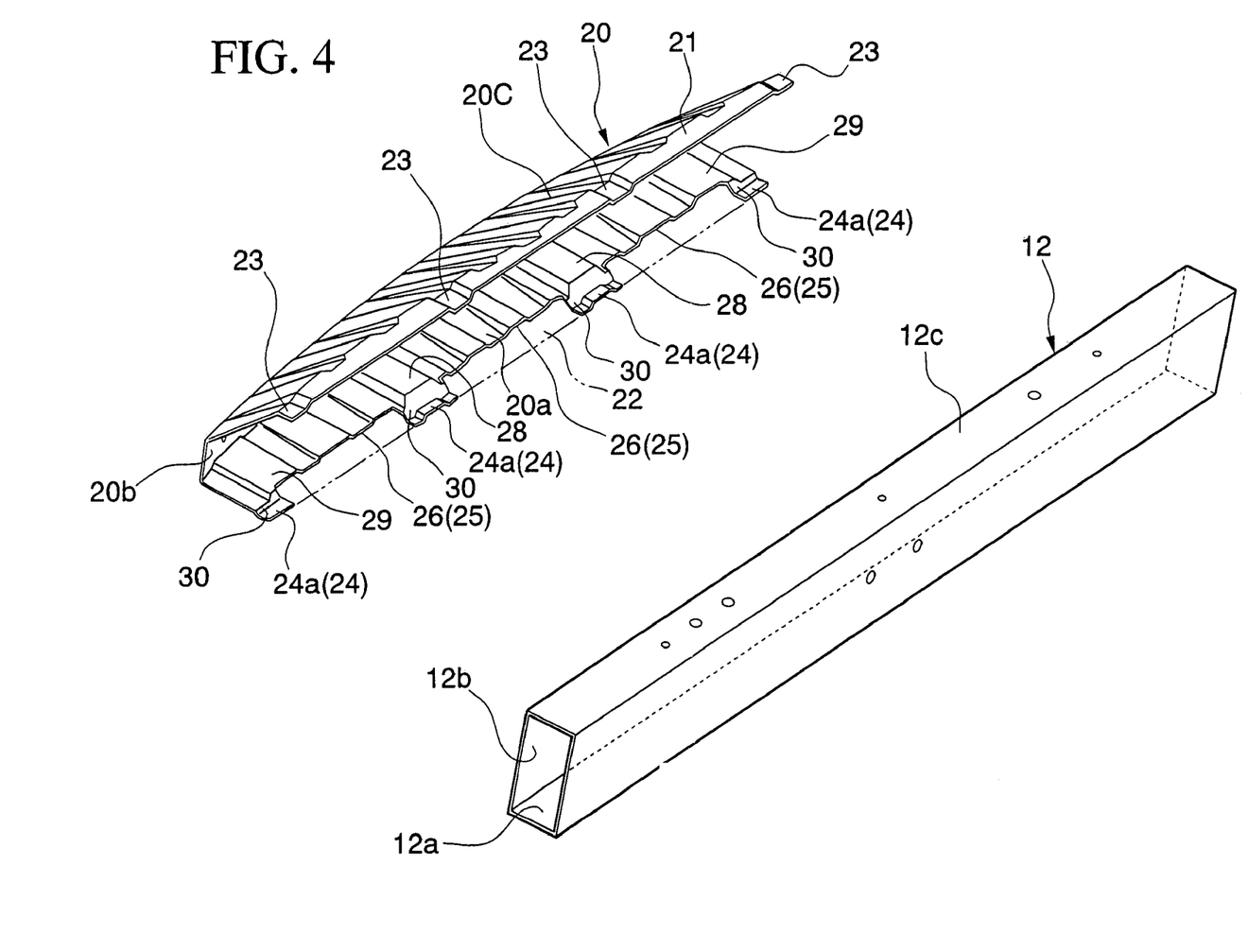
FIG. 4 is an exploded perspective view of the bumper beam and the safety plate.

To explain this matter with reference to FIG. 4 as well, the plate upper wall portion 20c of the safety plate 20 is curved so that, at its upper side rear edge portion (open edge portion) 21, it becomes generally horizontal along its entire extent, and a plurality of upper edge joining portions 23 (at four spots, in the shown embodiment) which are provided at roughly equal intervals upon the upper side rear edge portion 21 are contacted against the frontal portion of the beam upper wall portion 12c of the bumper beam 12, so as to be borne thereupon.

In this state, each of the upper edge joining portions 23 is joined to the beam upper wall portion 12c by being welded thereto.

The plate bottom wall portion 20a of the safety plate 20 is provided so as to be at almost the same height as the beam bottom wall portion 12a of the bumper beam 12. At the lower side rear edge portion (the open edge portion) 22 of this plate bottom wall portion 20a, there are provided a plurality of cutaway portions 25 (three in the shown embodiment), so as to leave portions thereof as joining leg portions 24 with the bumper beam 12. In other words, there are provided a plurality of sites (four in the shown embodiment) on both sides of the cutaway portions 25, which remain as the joining leg portions 24. Due to these cutaway portions 25, the rear edges (hereinafter termed the cutaway rear edges 26) at the sites upon the plate bottom wall portion 20a at which these joining leg portions 24 are not present are separated by a predetermined amount from the beam front wall portion 12b of the bumper beam 12.

Each of the rear end portions 24a of these joining leg portions 24 is contacted from the underneath against the beam bottom wall portion 12a of the bumper beam 12, and, in this state, they are connected to the beam bottom wall portion 12a by being welded thereto. It should be understood that support legs 27 are provided between both side portions of the plate front wall portion 20b of the safety plate 20 and the beam front wall portion 12b of the bumper beam 12, so as to extend therebetween (refer to FIGS. 2 and 3).

Embossing processing is appropriately performed upon the plate upper wall portion 20c and the bottom wall portion 20a of the safety plate 20, so as to extend generally along the longitudinal direction of the vehicle. Thus, between each of the two joining leg portions 24 at the inside in the vehicle widthwise direction of the plate bottom wall portion 20a and the plate front wall portion 20b, there is formed an internal reinforcing embossed portion 28 extending therebetween. In the same manner, between a site of the plate bottom wall portion 20a neighboring to each of the two joining leg portions 24 towards the outside of the vehicle in its widthwise direction and the plate front wall portion 20b, there is formed an external reinforcing embossed portion 29 extending therebetween. It should be understood that each of these reinforcing embossed portions 28 and 29 is formed by deforming the plate bottom wall portion 20a in the upwards direction, as shown in FIG. 3.

At each of the joining leg portions 24 of the plate bottom wall portion 20a of the safety plate 20, there is provided a deformation guide portion 30 for causing the lower side rear edge portion 22 of the plate bottom wall portion 20a to slant in the direction inward with respect to the cross section of the safety plate 20, during the initial deformation when collision energy in the rearward direction has been applied to the bumper face 11.

Figure 5:
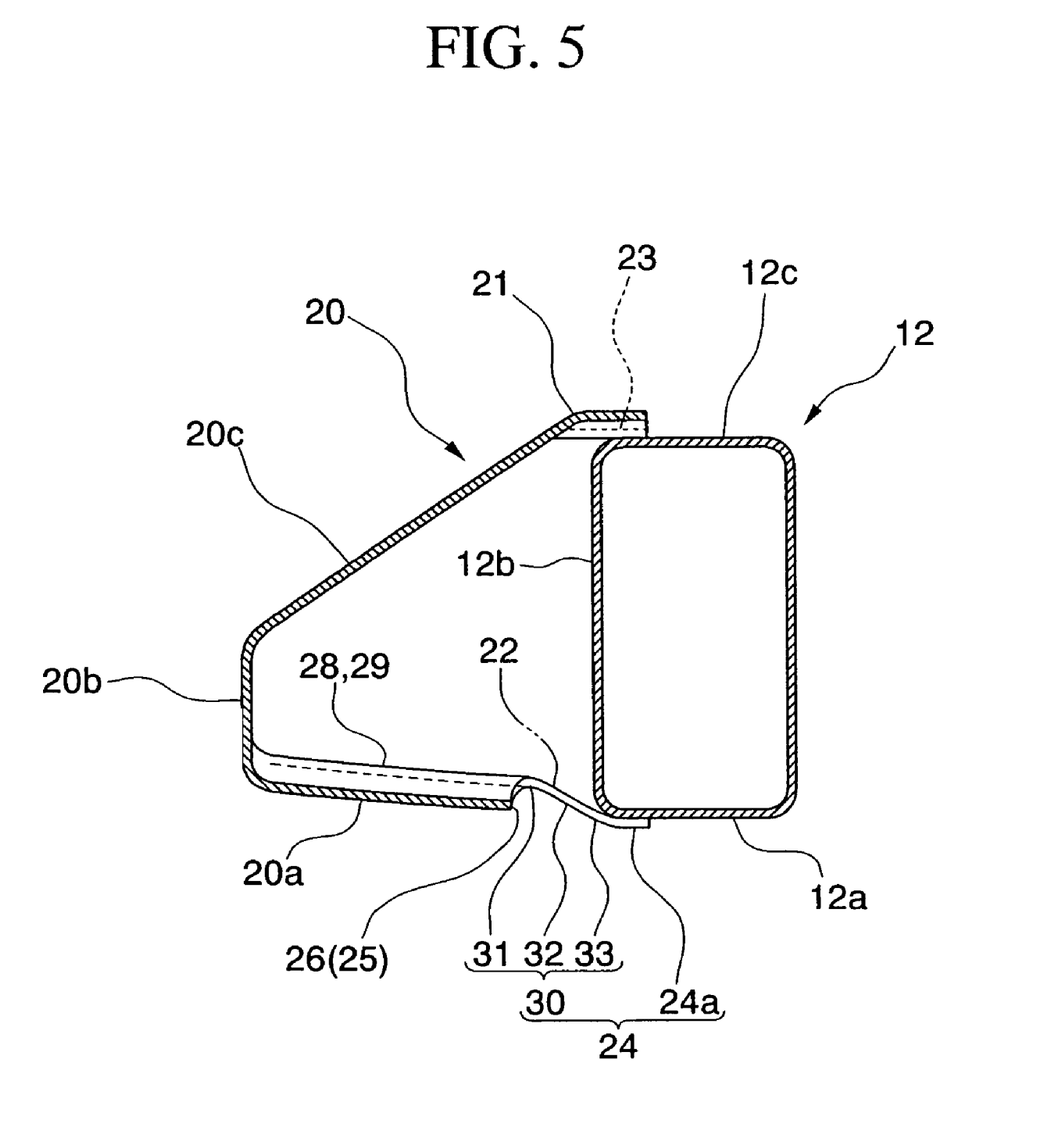
FIG. 5 is an enlarged view of pivotal portions of FIG. 1.

As shown in FIG. 5, each of these deformation guide portions 30 includes a front side curved portion 31 which is in a position which adjoins to the cutaway rear edge 26 above the plate bottom wall portion 20a as seen from the side of the vehicle, a sloping wall 32 which extends from the rear thereof downward to the rear, and a rear side curved portion 33 which is located at the rear edge of the sloping wall 32; and the rear end portion 24a extends onward to the rear from the rear side curved portion 33. In other words, the rear end portion 24a of each of the joining leg portions 24 is joined to the bumper beam 12, after the joining leg portion 24 has been deformed from the plate bottom wall portion 20a downwards via the deformation guide portion 30 (or, to put it in another manner, in cross section, in the outward direction relative to the safety plate 20).

Next, the manner in which the above described structure operates during a collision will be explained.

Figure 6A:
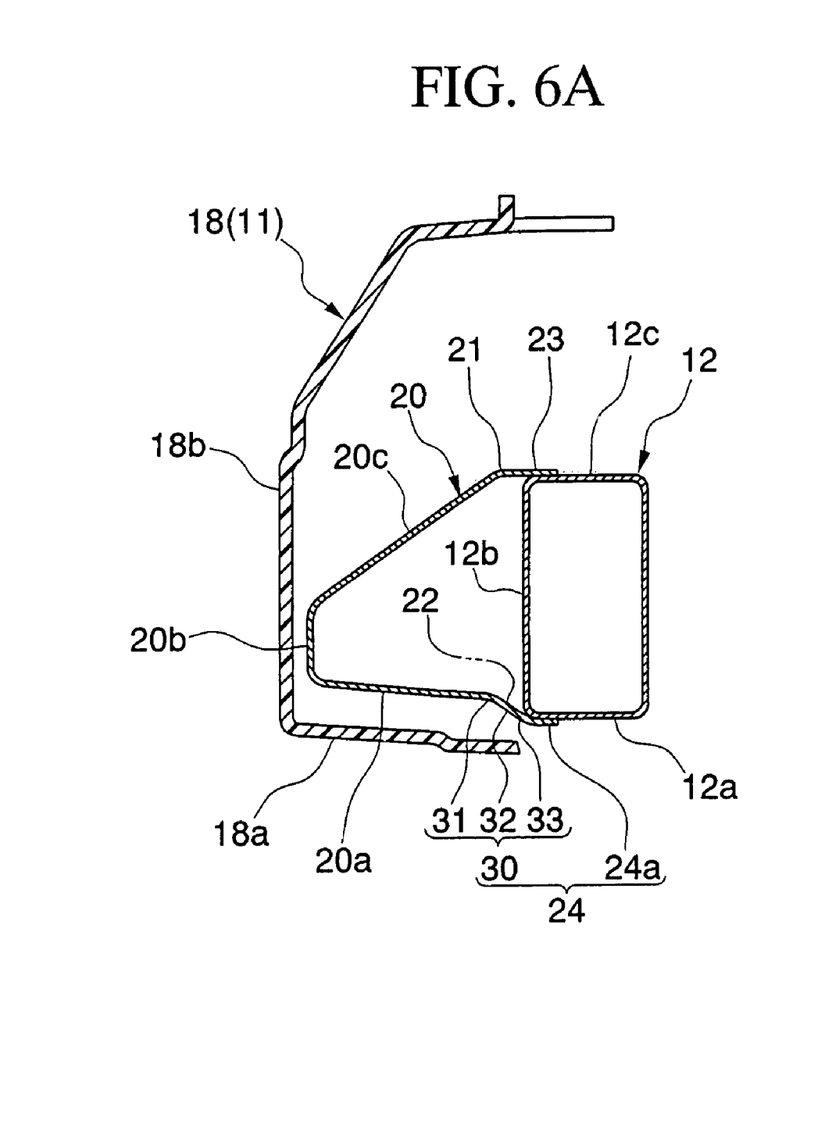
FIGS. 6A and 6B are explanatory views showing the manner in which a joining leg portion of the safety plate deforms during a collision.

FIG. 6A shows the situation for the joining leg portions 24 before the collision; and when, from this state, collision energy is applied to the bumper face 11 in the rearward direction, the bumper face 11 deforms and its bumper front wall portion 18b comes into contact with the plate front wall portion 20b of the safety plate 20, so that the energy (load) is inputted to the safety plate 20 via the bumper face 11.

At this time, since the reaction force is concentrated upon the joining leg portions 24 which have been partially left between the cutaway portions 25, deformation first starts to take place at these joining leg portions 24.

Figure 6B:
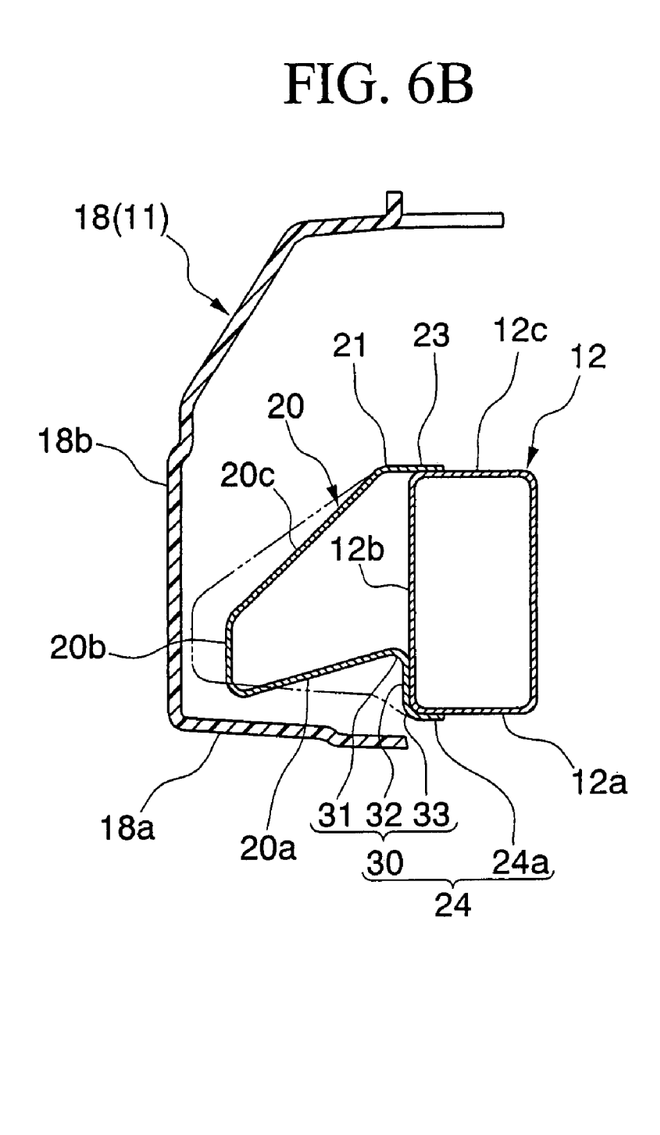

Since, in each of the joining leg portions 24, the deformation guide portion 30 is provided, in which the rear end portion 24a which is joined to the bumper beam 12 is bent in the downward direction, accordingly, when the load is inputted towards the rearward direction, as shown in FIG. 6B, the sloping wall 32 is deformed so as to swing in the upward direction around the rear side curved portion 33 as a center, and the front side curved portion 31 comes to shift in the upward direction, in other words, in cross section, towards the direction of the interior of the safety plate 20.

Since the front side curved portion 31 is above the plate bottom wall portion 20a, accordingly, by this front side curved portion 31 shifting in the upwards direction, the plate bottom wall portion 20a comes to tilt, so as to shift the lower side rear edge portion 22 in the upwards direction about its front edge as a center. In other words, the plate bottom wall portion 20a is deformed from the roughly horizontal state to a state in which its rear portion is raised.

Figure 7A:
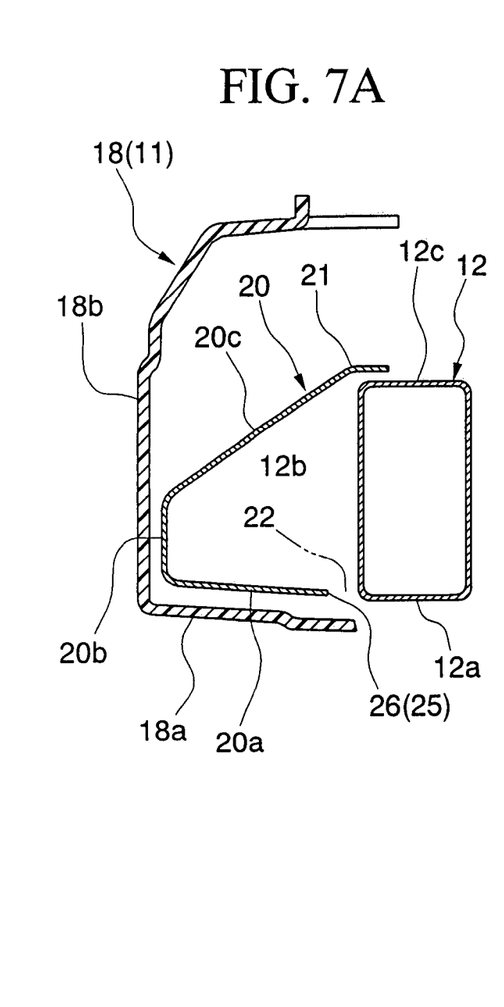
FIGS. 7A to 7C are explanatory views showing the manner in which a cutaway portion of the safety plate deforms during a collision.

FIG. 7A shows the state at one of the cutaway portions 25 before the collision, and, in this state, the roughly horizontal plate bottom wall portion 20a is positioned at roughly the same height as the beam bottom wall portion 12a of the bumper beam 12, and moreover the cutaway rear edge 26 is separated from the beam front wall portion 12b of the bumper beam 12.

Figure 7B:
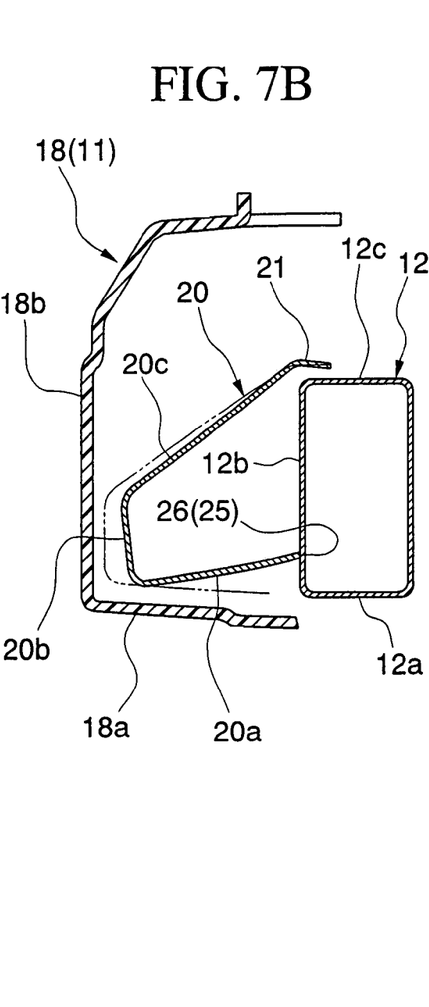

When from the state described above collision energy in the rearwards direction is inputted to the safety plate 20, then, as shown in FIG. 7B, due to the operation of the deformation guide portions 30, the plate bottom wall portion 20a deforms in the state of rising upwards and backwards until the point at which the cutaway rear edge 26 comes into contact with the beam front wall portion 12b of the bumper beam 12.

Figure 7C:
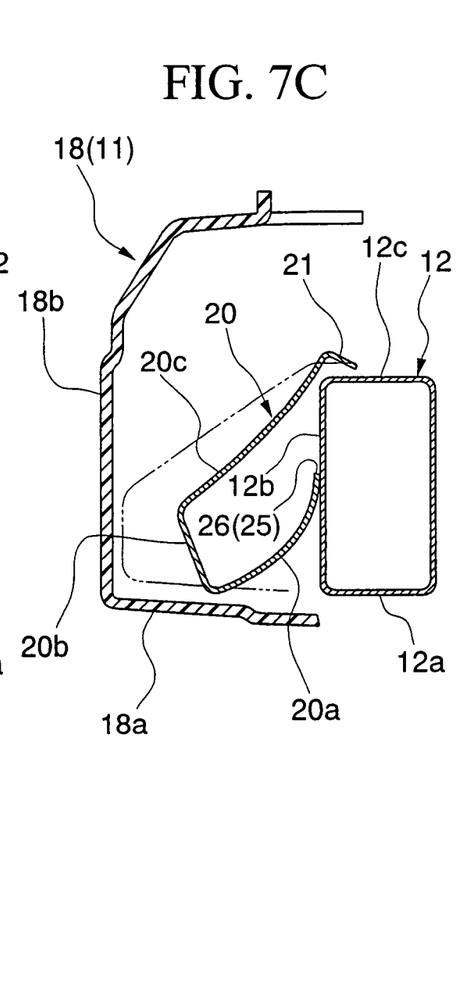

When the deformation of the safety plate 20 proceeds further from the state in which the cutaway rear edge 26 has come into contact with the beam front wall portion 12b of the bumper beam 12, the plate bottom wall portion 20a does not undergo buckling deformation in an irregular manner, but rather, as shown in FIG. 7C, the cutaway rear edge 26 slides towards the upwards direction along the surface of the beam front wall portion 12b of the bumper beam 12, and the entire body of the plate bottom wall portion 20a deforms so as to be collapsed in the direction towards the interior of the safety plate 20, in cross section. In this manner, the safety plate 20 collapses in a smooth manner.

Thus, the vehicle body frontal structure according to the above described preferred embodiment of the present invention is one in which, between the bumper face 11 and the bumper beam 12 which extend in the widthwise direction of the vehicle, there is provided the safety plate 20 which has a hollow cross sectional shape of which a rear portion is left open, and of which the rear edge portions 21 and 22, which are open edge portions thereof, are joined to the bumper beam 12, and which, when collision energy in the rearwards direction of the vehicle is applied to the bumper face 11, absorbs the energy by deformation of the safety plate 20; wherein, in the lower side rear edge portion 22, there are provided the cutaway portions 25 which leave portions of the lower side rear edge portion 22 as the joining leg portions 24 to the bumper beam 12, and, in the joining leg portions 24, there are provided the deformation guide portions 30 which, in the initial period of deformation by the collision energy, cause the lower side rear edge portion 22 to tilt in a predetermined direction.

When due to a collision some object comes into contact with the bumper face 11, so that collision energy in the rearward direction of the vehicle is applied to the bumper face 11, and the energy is inputted to the safety plate 20 and starts to deform it, first, this deformation begins at the joining leg portions 24 which are left between the cutaway portions 25. At this time, due to the provision of the deformation guide portions 30, the lower side rear edge portion 22 deforms so as to tilt towards the interior direction of the safety plate 20, in cross section, and, as the subsequent deformation is induced, it becomes possible for the safety plate 20 to be collapsed smoothly, so that, as a result, the amount of incomplete collapse in the safety plate 20 can be minimized.

In this manner, by minimizing the amount of incomplete collapse in the safety plate 20, it becomes possible to take advantage of the space between the bumper face 11 and the bumper beam 12, with no wastage of the deformation stroke of the safety plate 20. In other words, it is possible to enhance the collision energy absorption efficiency of the vehicle body frontal portion. Furthermore, there is no influence upon the design of the bumper face 11 or upon the component layout surrounding the bumper beam 12 or the like, and it is possible to enhance the freedom of design of the vehicle body frontal portion.

Moreover, by providing the cutaway portions 25, it is possible to anticipate a lightening of the safety plate 20. Furthermore, by the deformation guide portions 30 being provided so that, in cross section, they are deformed in the direction towards the interior of the safety plate 20, it becomes difficult for these deformation guide portions to become inverted, even when the safety plate 20 is manufactured by press forming. Although it is also possible to set the deformation guide portions 30 so that the plate bottom wall portion 20*a* of the safety plate 20 is deformed in the outward direction, in cross section, it is preferable for the plate bottom wall portion 20*a* to deform in the inward direction, in cross section, from the point of view of avoiding interference between the lower side rear edge portion 22 and the bumper face 11.

It should be understood that the present invention is not to be considered as being limited to the embodiment disclosed above; for example, it would also be acceptable for the upper side rear edge portion 21 to be joined to the bumper beam 21 via joining leg portions as well. Furthermore, it would also be acceptable for the safety plate 20 to be made, as an energy absorbing member, from resin or the like, instead of being made from a pressed steel plate. Moreover, a structure would also be acceptable in which separate joining leg portions 24 were joined to the main body of the safety plate 20.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle body frontal structure comprising:

a bumper face extending in a widthwise direction of a vehicle;

a bumper beam disposed behind the bumper face and extending in the widthwise direction of the vehicle; and an energy absorbing member disposed between the bumper face and the bumper beam, formed in a hollow cross sectional shape of which a rear portion is left open, and having an open edge portion that is joined to the bumper beam, so as to deform and absorb collision energy when the collision energy in a rearwards direction of the vehicle is applied to the bumper face;

wherein the open edge portion comprises cutaway portions which leave portions of the open edge portion as joining leg portions to the bumper beam, and wherein the joining leg portions are provided with deformation guide portions which, in the initial period of deformation by the collision energy, cause the open edge portion to tilt in a predetermined direction.

2. A vehicle body frontal structure comprising:

a bumper face extending in a widthwise direction of a vehicle;

a bumper beam disposed behind the bumper face and extending in the widthwise direction of the vehicle; and an energy absorbing member disposed between the bumper face and the bumper beam, formed in a hollow cross sectional shape of which a rear portion is left open, and having an open edge portion that is joined to the bumper beam, so as to deform and absorb collision energy when the collision energy in a rearwards direction of the vehicle is applied to the bumper face;

wherein the open edge portion comprises joining leg portions that are joined to the bumper beam, and wherein the joining leg portions are provided with deformation guide portions which, in the initial period of deformation by the collision energy, cause the open edge portion to tilt in a predetermined direction.

* * * * *